Sept. 29, 1970 J. A. PERSEGHETTI 3,531,063
VERTICAL TAKE-OFF AIRCRAFT WITH DUAL GYRO GUIDING SYSTEM
Filed May 16, 1968 2 Sheets-Sheet 1
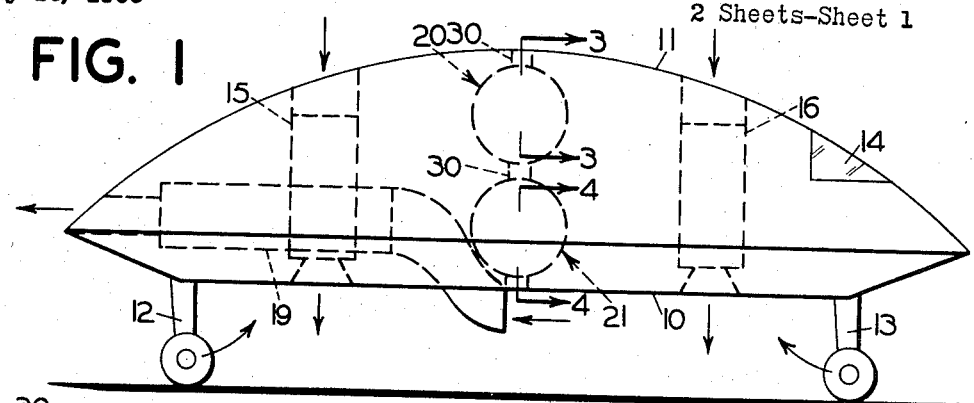
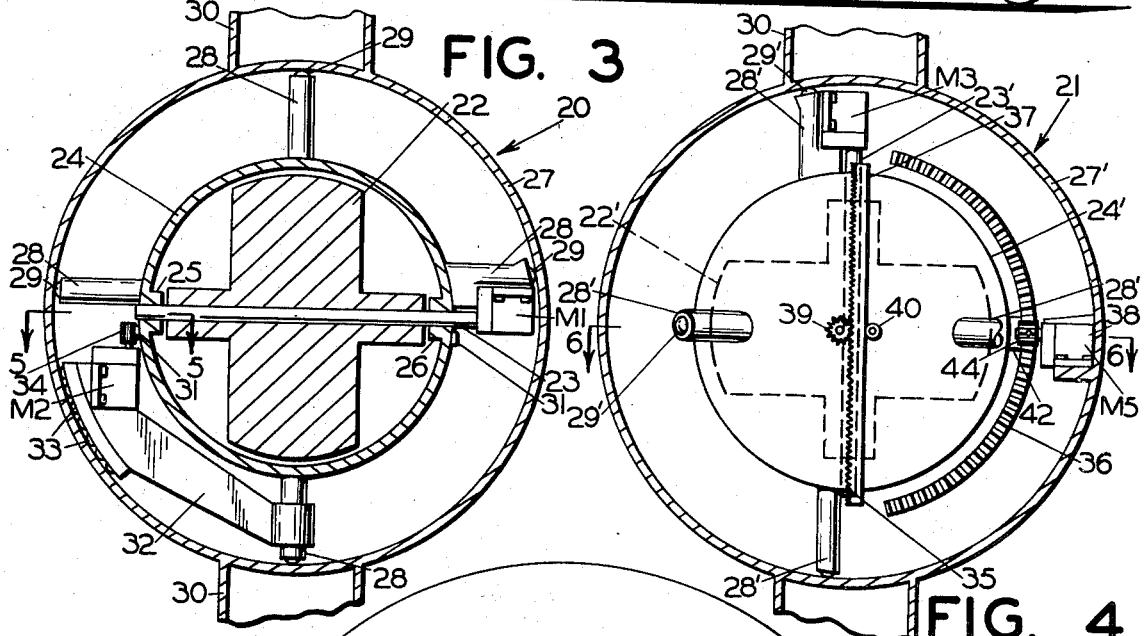
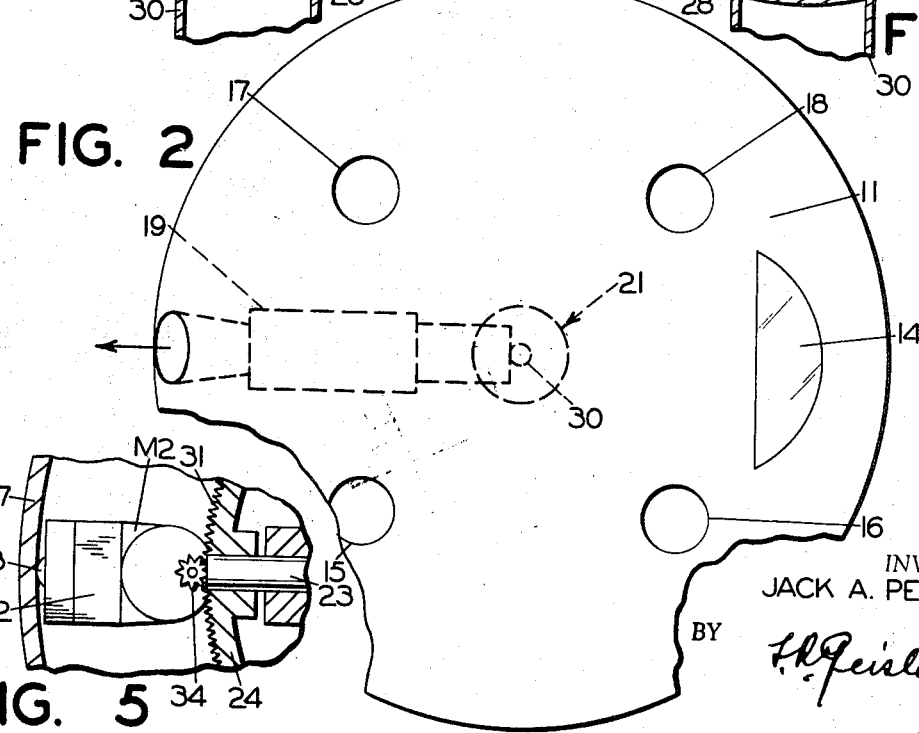
INVENTOR.
JACK A. PERSEGHETTI
BY
ATTY.

Sept. 29, 1970  J. A. PERSEGHETTI  3,531,063
VERTICAL TAKE-OFF AIRCRAFT WITH DUAL GYRO GUIDING SYSTEM
Filed May 16, 1968

INVENTOR.
JACK A. PERSEGHETTI
BY
ATTY.

United States Patent Office 3,531,063
Patented Sept. 29, 1970

3,531,063
VERTICAL TAKE-OFF AIRCRAFT WITH DUAL GYRO GUIDING SYSTEM
Jack A. Perseghetti, 3512 Q St.,
Vancouver, Wash. 98663
Filed May 16, 1968, Ser. No. 729,668
Int. Cl. B64c 29/04
U.S. Cl. 244—23                          3 Claims

ABSTRACT OF THE DISCLOSURE

A wingless aircraft employing jet propulsion means for vertical take-off and landing operations and separate jet propulsion means for flight travel, the guiding of the aircraft during flight travel being performed entirely through the intermediary of a pair of adjustable cooperating gyroscope assemblies.

BACKGROUND OF THE INVENTION

The possibility of using jet power for achieving a vertical take-off, and similarly in enabling a substantially vertical landing to be performed, with an aircraft has been described in previous patents, as for example in U.S. Pat. No. 3,099,420, issued July 30, 1963, to Messerschmidt et al., and U.S. Pat. No. 3,208,695, issued Sept. 28, 1965, to Aruta. The use of gyroscopes as stabilizers in various fields is known to be old. However, in the present invention the tendency of gyroscopes to maintain a fixed axis of rotation is utilized as the sole means of guiding the aircraft in flight travel.

SUMMARY OF THE INVENTION

The aircraft with which this invention preferably is employed has no ailerons, fins, customary stabilizers, rudders, or even the usual wings. A plurality of jet propulsion units are mounted in the aircraft to exert a controlled thrust in a vertical direction, enabling the aircraft to make a vertical take-off, to attain and maintain a desired elevation, and to make a landing. A separate jet propulsion unit on the aircraft, exerting a controlled thrust in a substantially horizontal direction, provides the means for propelling the aircraft in flight.

A gyroscope assembly is so mounted and arranged in the aircraft that the axis of rotation of the gyroscope is normally substantially horizontal but means is provided for relatively turning the rotational axis of the gyroscope with respect to the aircraft in the substantially horizontal plane of the axis. The resistance to such axial change results in the lateral turning of the aircraft in the opposite direction.

A second very similar gyroscope assembly is similarly mounted in the aircraft with the axis of rotation of the gyroscope normally substantially vertical, and means is similarly provided for turning the rotational axis of this second gyroscope relatively with respect to the aircraft in either of two substantially vertical planes extending at 90° with respect to each other and intersecting on the rotational axis of this gyroscope. The resistance to such axial change results in the tippings of the aircraft from the horizontal plane.

The first mentioned gyroscope assembly is so mounted that it can be made free to maintain its normal axis position, in other words, so that it will be free to be self-adjusting during the change of course or tipping of the aircraft produced by the other gyroscope assembly, and also so mounted that it can be secured in a set position when relative turning of the aircraft with respect to such set position is desired. The two gyroscope assemblies can be manipulated separately to produce their intended relative axial adjustments with respect to the aircraft, or can be caused to cooperate in producing composite directional changes of the course of the aircraft.

BRIEF DESCRIPTION OF THE DRAWINGS

In the drawings:

FIG. 1 is a side elevation of the aircraft in resting position on the ground, with the two near side vertically mounted jet propulsion means, the horizontally mounted jet propulsion means, and the spherical housings for the two gyroscope assemblies indicated by broken lines;

FIG. 2 is a top plan view of the aircraft with the location of the various jet propulsion means and the two gyroscope assemblies indicated by broken lines;

FIG. 3 is a partially schematic sectional elevation of one of the gyroscope assemblies taken on the line indicated at 3—3 in FIG. 1, drawn to a larger scale;

FIG. 4 is a similar partially schematic sectional elevation of the second gyroscope assembly taken on the line indicated at 4—4 in FIG. 1, drawn to the same scale as FIG. 3;

FIG. 5 is a fragmentary section on line 5—5 of FIG. 3, drawn to a larger scale;

DESCRIPTION OF THE PREFERRED EMBODIMENT

Figure 6:
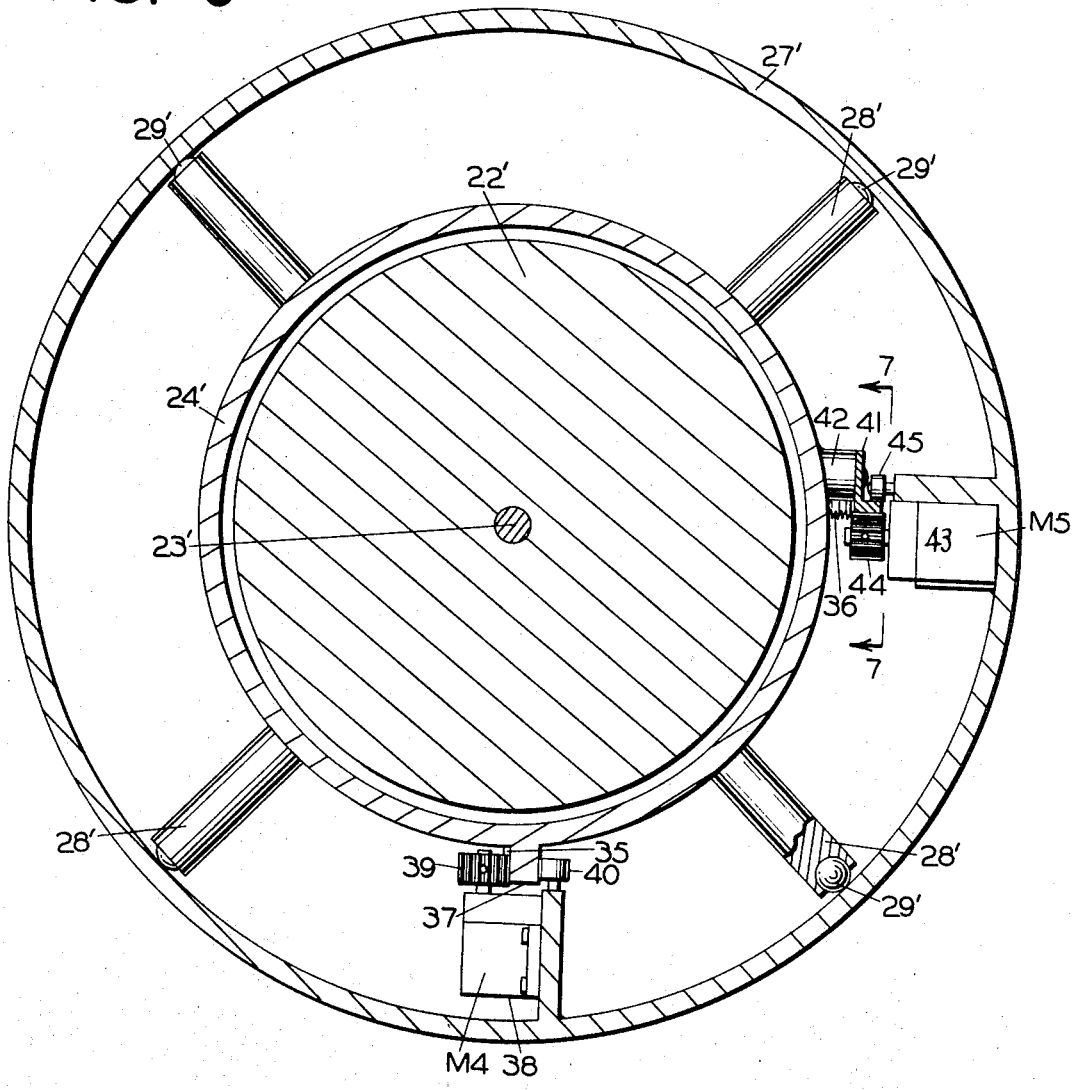
FIG. 6 is a section on line 6—6 of FIG. 4 drawn to a larger scale.
Figure 7:
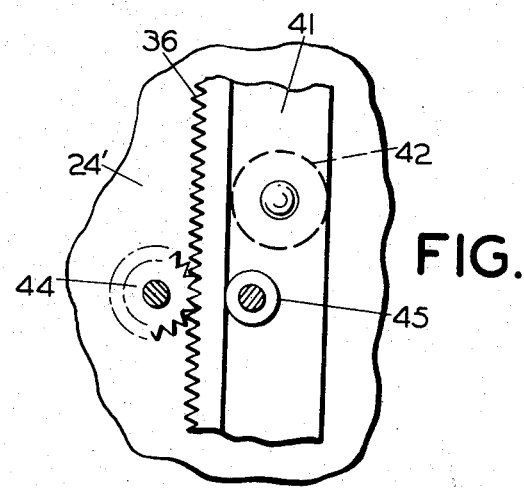
FIG. 7 is a fragmentary section on line 7—7 of FIG. 6.

Referring first to FIG. 1 of the drawings, the aircraft includes a housing shell having a circular dished base portion 10 and a complementary circular convex top portion or skin 11.

The aircraft has a pair of retractable rear landing wheel assemblies, one of which is indicated at 12 in FIG. 1, and a similar retractable forward landing wheel assembly indicated at 13. The control compartment (not shown) for the operator is located in the front portion of the aircraft and is provided with a suitable windshield indicated at 14. The door leading into the interior of the aircraft is omitted from the drawings.

Four vertical jet propulsion engines (see also FIG. 2), indicated at 15, 16, 17, and 18, provide the means for vertical take-off for the aircraft, for maintaining elevation, and for landing the aircraft. A horizontal jet engine, indicated at 19, provides the propulsion means for driving the aircraft in flight.

Two gyroscope assemblies, indicated in general at 20 and 21 in FIG. 1, located on the central vertical axis of the aircraft, provide the sole means for guiding the aircraft in flight. These gyroscope assemblies are similar except that the rotational axis of the weighted gyro disc in one assembly, thus in the gyroscope assembly 20, is normally substantially horizontal, while that in the other gyroscope assembly 21 is normally substantially vertical.

Referring to FIG. 3, the gyroscope assembly 20 includes a weighted gyro disc 22 which is secured on the normally substantially horizontal shaft 23. The shaft 23 extends diametrically through a spherical cage 24 which has suitable bearings 25 and 26 for the end portions of the shaft respectively. The spherical cage 24 is concentrically mounted within a spherical housing 27 by means of a plurality of arms 28 which are secured on the cage 24 and which have antifriction bearing balls 29 at their outer ends which ride on and are in engagement at all times with the inside surface of the housing shell 27. The housing shell 27 is rigidly secured in a support mounting indicated at 30 in FIGS. 1 and 3, which support mounting is centrally and vertically positioned in the aircraft.

A motor M1 (FIG. 3) mounted on one of the arms 28 secured to the cage 24, is connected with the shaft 23 through suitable gearing and causes rotation of the shaft 23, and therewith of the gyro disc 22. The disc 22 is rotated at constant speed at all times when the aircraft is in operation.

An endless gear train 31 extends around the outside of the cage 24 immediately below the shaft 23 in a normally horizontal plane parallel to the shaft 23. A carrier bracket 32, having one end rotatably supported on one of the arms 28 has the other end resting against the inside surface of the spherical housing shell 27 through the intermediary of anti-friction balls 33. This carrier bracket supports a reversible motor M2 which drives a gear wheel 34 (see also FIG. 5) which is in mesh at all times with the endless gear train 31. A magnetic friction brake (not shown) is also mounted in the carrier bracket 32, and, when activated, engages the inside face of the spherical housing 27 to hold the carrier bracket 32 against movement with respect to the spherical housing 27. The arrangement is such that the operation of motor M2, when the friction brake of the carrier bracket 32 is activated, will cause the cage 24, and therewith the axis of the gyro disc 22, to be turned relatively with respect to the housing shell 27 in the normally substantially horizontal plane of the shaft 23.

From the description thus far it will be understood that when the aircraft is in operation, thus with the gyro disc 22 rotating constantly, and with the endless gear train 31 in a substantially horizontal plane, the operation of the motor M2, with the friction brake of the carrier bracket 32 activated, will cause the axis of rotation of the gyro disc 22 to turn relatively laterally with respect to the spherical shell housing and thus with respect to the aircraft. However, due to the known principle common to gyroscopes any such change in the direction of the axis will be resisted by the rotating disc 22 and this resistance will tend to cause the carrier bracket 32, and therewith the housing shell 27 and the aircraft itself, to turn oppositely laterally relatively with respect to the axis of the disc, with the position of the latter remaining practically unchanged. Since there will be comparatively little resistance to such lateral turning of the aircraft in flight, the operation of the motor M2 can act to cause the aircraft to turn laterally in one direction or the other.

The other gyroscope assembly 21 is similar to gyroscope assembly 20 except that the axis of rotation 23' (FIG. 4) of the gyro disc 22' is normally substantially vertical instead of horizontal. The gyro disc 22' is mounted in a spherical cage 24', similar to the cage 24 of the gyroscope assembly 20 and the spherical cage 24 is mounted in a spherical housing shell 27', similar to the housing shell 27 of the assembly 20. Arms 28', having anti-friction balls 29' at their outer ends, support the cage 24' within the spherical housing shell 27', and a motor M3, carried by one of the arms 28', drives the shaft 23' and therewith the gyro disc 22'.

The spherical cage 24', however, instead of having a single gear train extending around on its outer surface, has a pair of gear trains 35 and 36 (FIGS. 4 and 6), each approximately 180 degrees in length, mounted on its exterior, extending in intersecting planes which are normally substantially perpendicular to each other. The gear train 35 is carried on an exterior rib flange 37 (FIG. 6) formed integrally with or rigidly secured to the cage 24' extending approximately halfway around the cage 24' and located in the same plane as the axis of rotation 23' of the gyro disc 22'. A reversible motor M4, mounted in a housing block 38 secured in the housing shell 27', drives a gear wheel 39 which is in mesh at all times with the gear train 35. A guide roller 40, carried by the housing block 38, bears against the rib flange 37 on the side opposite from the gear train 35 and prevents any possibility of the gear wheel 39 getting out of mesh with the gear train 35.

The gear train 36 is formed on a curved bar 41 which extends approximately halfway around the cage 24' concentric with the cage 24' and centrally mounted on a block 42 secured on the cage 24'. A reversible motor M5, mounted in a housing block 43, drives a gear wheel 44 which is in mesh at all times with the gear train 36 of the bar 41. A guide roller 45, carried by the housing block 43, bears against the face of the bar 41 opposite that on which the gear train 36 is carried, and holds the gear wheel 44 in mesh with the gear train 36 at all times.

The operation of motor M5, causing relative inclining of the axis of the gyro disc 22' towards one side or the other with respect to the housing shell 27', and thus with respect to the aircraft, and the resistance offered against such change of position of the axis of rotation of the gyro disc 22', will exert a force to cause the housing shell 27', and therewith the aircraft, to tip laterally in an opposite direction.

Similarly the operation of motor M4, causing relative inclining of the axis of rotation of the gyro disc 22 forwardly or rearwardly from the vertical with respect to the housing shell 27', and thus with respect to the aircraft, will exert a force to cause the housing shell 27', and therewith the aircraft, to tip oppositely.

Thus, for example, when the aircraft is proceeding in a horizontal course, the actuation of motor M2 with the friction brake in the carrier bracket 32 applied, causing relative turning of the axis of the gyro disc 22 towards one side or the other, will result in a force being exerted to turn the aircraft towards one side or the other in the horizontal course, depending upon the direction of rotation of the reversible motor M2. Such turning in the horizontal course will not be resisted by gyro disc 22' since the axis of rotation of gyro disc 22' will continue to be substantially vertical. Similarly the actuation of either motor M4 or M5, changing the relative positioning of the axis of a gyro disc 22' with respect to its spherical housing shell 27', with the friction brake in the carrier bracket 32 of the cage for the gyro disc 22 released, will result in a force being exerted to tip the aircraft from the horizontal course. The tipping of the aircraft from the horizontal course in such case will not be resisted by gyro disc 22 since the releasing of the brake carried by the bracket 32 enables the gyro disc to maintain its horizontal axis of rotation regardless of the change in position of the aircraft.

Suitable controls (not shown) are provided for the adjusting motors M2, M4 and M5 of the two gyroscope assemblies and for the friction brake in gyroscope assembly 20.

Thus, by proper control, manipulation and coordination of the two gyroscope assemblies, the aircraft will be guided in flight solely through the intermediary of the gyroscopes.

I claim:

1. In a vertical take-off aircraft, a fuselage, a plurality of propulsion units mounted in said fuselage for exerting thrust in a downward vertical direction, a propulsion unit mounted in said fuselage for exerting a forward thrust in a substantially horizontal direction, a first gryoscope assembly in said fuselage, a cage structure in said assembly, a gyroscope shaft rotatably supported in said cage extending diametrically through said cage, a gyroscope disc secured on said shaft, motor means carried by said cage for causing constant rotation of said shaft and disc, a substantially spherical housing, means supporting said cage concentrically within said housing, anti-friction elements in said supporting means enabling said cage to turn to a limited extent relative with respect to said housing, a carrier bracket in said housing on the outside of said cage, a rotatable connection between said cage and said carrier bracket so arranged as to enable said cage to be rotated relatively with respect to said carrier bracket on an axis perpendicular to said disc shaft, anti-friction bearing elements on said carrier bracket engaging said housing, friction brake means on said carrier bracket for holding said carrier bracket against movement in said housing when said friction brake means is activated, cooperating drive means on said carrier bracket and said cage so arranged as to cause the cage to turn relatively with respect to said carrier bracket on an axis perpendicular to said disc shaft when said drive means is actuated, a reversible motor in said drive means, a second gyroscope assembly in said fuselage similar to said first gyroscope assembly and including a substantially spherical housing with a cage structure concentrically supported in the housing by means enabling the cage to turn to a limited extent relatively with respect to the housing a gyroscope disc secured on a shaft mounted in and extending diametrically through the cage with similar motor means for causing constant rotation of the gyroscope shaft and disc in said second assembly, said housings for said assemblies rigidly mounted in said fuselage, said assemblies so arranged that the gyroscope shaft in said first and said second assemblies will be normal to each other, a first means including a reversible motor in said second assembly for causing relative rotation of the gyroscope cage with respect to said housing in said second assembly to take place on an axis perpendicular to the axis of rotation of the gyroscope disc in said second assembly, and second means including a reversible motor in said second assembly for causing relative rotation of the gyroscope cage with respect to said housing in said second assembly to take place on an axis perpendicular to the axis of rotation of the gyroscope disc and also perpendicular to the axis of the rotation of said cage with respect to said housing produced by said first means in said second assembly.

2. The combination set forth in claim 1 with said gyroscope shaft in said first assembly normally substantially horizontal and said gyroscope shaft in said second assembly normally substantially vertical.

3. The combination set forth in claim 1 with said fuselage being susbtantially circular in shape and with said spherical housings for said gyroscope assemblies mounted one above the other on the central vertical axis of said fuselage.

References Cited
UNITED STATES PATENTS

| | | | |
|---|---|---|---|
| 2,158,180 | 5/1939 | Goddard | 244—79 |
| 2,183,314 | 12/1939 | Goddard | 244—79 |
| 2,997,254 | 8/1961 | Mulgrave | 244—12 |
| 3,199,809 | 8/1965 | Modesti | 233—23 |

MILTON BUCHLER, Primary Examiner

T. W. BUCKMAN, Assistant Examiner.

U.S. Cl. X.R.

244—79